United States Patent [19]

Smolders

[11] Patent Number: 4,706,534
[45] Date of Patent: Nov. 17, 1987

[54] ROTATING CUTTING ELEMENT

[76] Inventor: Cornelis Smolders, Collenkamp 18, 6903 VP Zevenaar, Netherlands

[21] Appl. No.: 911,584

[22] Filed: Sep. 24, 1986

[30] Foreign Application Priority Data

Oct. 11, 1985 [NL] Netherlands ............... 8502790

[51] Int. Cl.$^4$ ............................................. B27B 33/08
[52] U.S. Cl. ........................................ 83/844; 83/835; 83/840; 144/230; 407/49
[58] Field of Search ................. 83/835, 839, 840, 843, 83/844; 144/230; 407/47, 49, 51

[56] References Cited

U.S. PATENT DOCUMENTS 302,710   7/1884   Conover ............................. 83/843
4,009,742  3/1977  Ziegelmeyer ....................... 144/230

Primary Examiner—Donald R. Schran
Attorney, Agent, or Firm—Olson and Olson

[57] ABSTRACT

Rotating cutting element (1) having a row of cutters (5) placed in recesses at the circumference of a disc. Each recess has radially extending V-shaped front and rear edges (4,3), each cutter (5) has V-shaped front and rear edges (6,7) with the apexes facing away from each other. Each cutter (5) is held in the recess against an abutment (9) by means of a wedge (10) which is tensioned by means of a screw (15).

2 Claims, 1 Drawing Figure

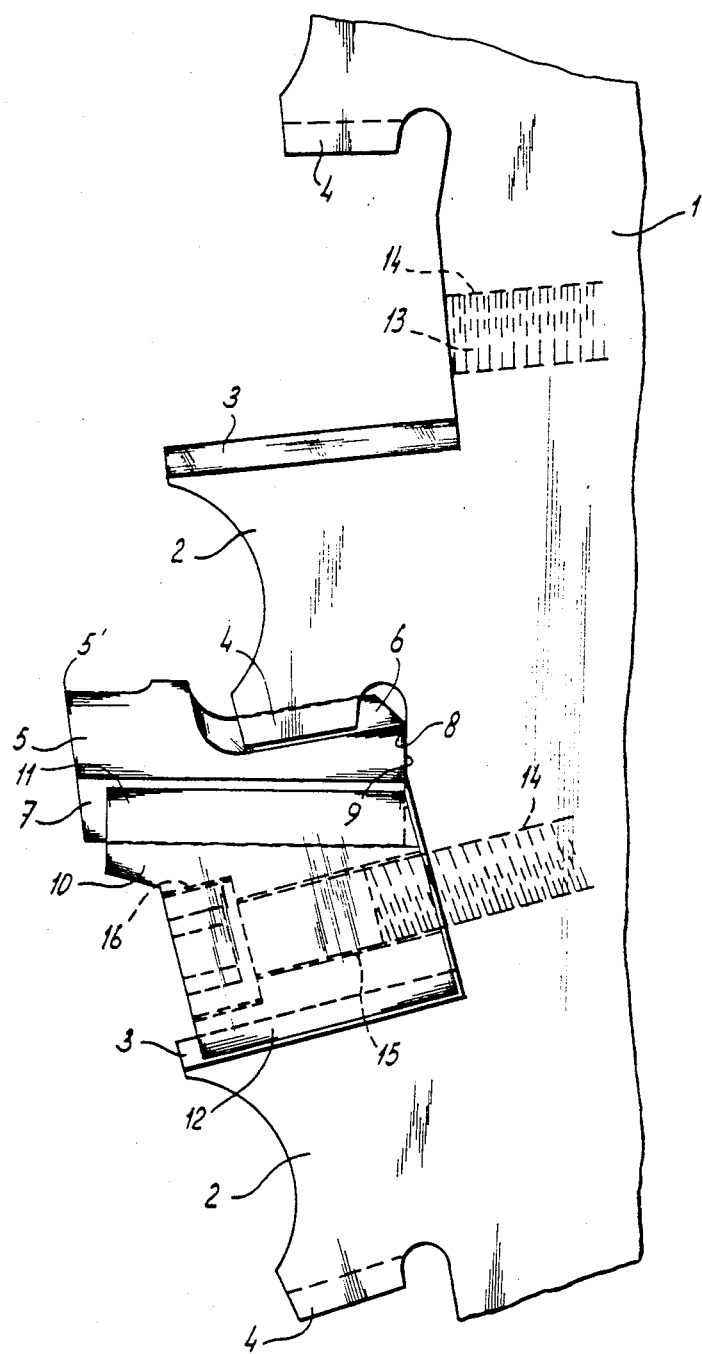

ROTATING CUTTING ELEMENT

BACKGROUND OF THE INVENTION

The invention relates to a rotating cutting element with a row of cutters which are fastened, detachably in the peripheral direction at regular intervals from each other in recesses in the periphery of a carrier by means of a wedge, where each cutter has a profiled front edge which fits into a complementarily shaped edge of the recess of the carrier, also a profiled front edge of the wedge, said wedge having a profiled rear edge which mates with the complementarily profiled rear edge of the recess, and where the front edge and rear edge of each cutter form an angle with each other which opens in the direction of the carrier, and each recess has an internal face which serves as a stop surface to the cutter.

Such a cutting element is known from UK specification No. 21297/1913 in the form of a circular saw. In the known cutting element it is known to fasten the cutters by means of a wedge which is plugged in and meets an abutment. This fastening has disadvantages because replacement of the cutters is difficult and it is quite impossible to obtain the same degree of retention for all cutters due to the inevitable tolerances. If the connection comes off, which could happen in the case of heavy loads or through vibrations, then there is a danger that the cutter could be flung out under the effect of centrifugal forces and could cause an accident.

The object of the invention is to produce a rotating cutting element permitting simple manufacture with great precision, without any risk to the environment, and with a fastening of the cutters which permits rapid and easy replacement, without any danger of a fastened cutter becoming detached and with the same rate of retention for each cutter.

According to the invention the profiled front and rear edges of each cutter and wedge are V-shaped, with the apexes of the V-faces of the cutter facing away from each other and the apexes of the V-faces of the wedge facing towards each other, and with the wedge fixed by means of a screw.

The invention thus relates to a special detachability which makes it possible to position precision-manufactured cutters accurately and to fix them well on the carrier, where retaining element and screw ensure the fastening and replacement can take place by unscrewing the screw.

Due to the fact that the V-shaped faces of the cutter face away from each other manufacturing is possible with high precision. With the screw the wedge can be given the proper tension, so that all cutters are held in the same way. Replacement is now easy. Through the fact that stop surface and the inside end of the cutter are perpendicular to the radius and the rear edge of the cutter is also preferably parallel to the radius of the carrier, the cutter can be manufactured with great precision, since the cutter can be manufactured with great precision, since the distance between the cutting edge and the inside edge can be determined accurately, for example through grinding. Through the inward opening wedge angle, the cutter is pressed against the stop and thus accurately positioned.

The retaining element is designed in such a way that front and rear edge of the retaining element together form an acute angle which opens outwards. With this opposing wedge angle of the retaining element one achieves good retention, and if the centre line of the screw connection is also parallel to the rear edge of the retaining element, also a retaining element which can also be manufactured with great precision and can be accurately placed with its internal face standing perpendicular to the centre line of the screw connection against a face of the carrier running in corresponding fashion.

If the retaining element is also fastened with a screw provided with a part with ring-handed screw thread and a part with left-handed screw thread, of which one part projects into the carrier and the other part into the retaining element, then one obtains a connection which on unscrewing results in the retaining element moving away from the cutter, so that the cutter can be replaced without the retaining element having to be removed.

The invention will now be explained in greater detail with reference to the drawing of a preferred embodiment.

BRIEF DESCRIPTION OF THE DRAWINGS

The single FIGURE is a fragmentary side elevation of a part of a circular saw embodying the features of this invention.

DESCRIPTION OF THE PREFERRED EMBODIMENT

The circular saw shown in the drawing consists of a carrier 1, in the form of a disc which is attached to a shaft which is not shown. This carrier 1 has placed at regular intervals from each other projections 2 with a V-shaped front edge 3 and a rear edge 4 which is designed in the form of a V-shaped groove. Both edges form an angle with the radius, which in the case of the front edge can be 15° and in the case of the rear edge can be 0°.

Shown at 5 is a cutter with cutting edge 5'. This cutter has a V-shaped front edge 6 and, facing in the opposite direction, a V-shaped rear edge 7. The edge 6 and the edge 7 form an angle with each other, for example of 10°, which opens in the direction of the carrier. The carrier also has a stop surface 8 which mates with the inside end 9 of the cutter.

The fastening takes place with a retaining piece 10, which is provided with a V-shaped front edge 11, in the form of a groove, and with a V-shaped rear edge or groove 12 which mates with the V-shaped front edge 3 of the projection 2 of the carrier.

The carrier has bores 14 provided with screw thread 13 for accommodating a screw which goes through the bore 15 of the retaining element 10 and has a head which is sunk in a recess 16 of the retaining element.

For fastening of a cutter by means of the retaining element, the retaining element will be moved by means of the screw towards the carrier and fixed, while at the same time the cutter is taken in the same direction until its inside edge 9 comes against the stop surface 8. The angle between the front edge 6 and the rear edge 7 of the cutter ensures good retention, a retention which can only be reinforced if stress occurs.

Instead of on a circular saw, the fastening can also be used on other rotating cutting elements, such as a cup-shaped saw. Where mention is made above of the rear edge of the cutter running parallel to the radius of the circular saw and the various angles relative to the radius, in the case of a cup-shaped saw instead of the radius, lines will have to be used which run parallel to the axis of rotation of the cup saw. Since the carrier is then cup-shaped and is thus curved in the peripheral direction, the centre part faces of the V-shaped edges will run parallel to the tangent of the curve.

I claim:

1. A rotating cutting element with a row of cutters which are fastened detachably in the peripheral direction at regular intervals from each other in recesses in the periphery of a carrier by means of a wedge, where each cutter has a profiled rectilinear front edge which fits into a complementarily shaped edge of the recess of the carrier, also a rectilinear profiled rear edge which fits into the complementarily profiled front edge of the wedge, said wedge having a rectilinear profiled rear edge which mates with the complementarily profiled rear edge of the recess, and where the front edge and rear edge of each cutter form an angle with each other which opens in the direction of the carrier, and each recess has a flat internal face which serves as a stop surface for the flat internal face of the cutter, which flat faces have surface contact, characterized in that the profiled edges of each cutter and wedge are V-shaped, with the apexes of the V-faces of the cutter facing away from each other and the apexes of the V-faces of the wedge facing towards each other, and with the wedge fixed to the carrier by means of a screw.

2. The cutting element according to claim 1, characterized in that the rear edge of the cutter is parallel to the radius of the carrier.

* * * * *